US012761624B2

(12) United States Patent
Martin et al.

(10) Patent No.: US 12,761,624 B2
(45) Date of Patent: Oct. 13, 2026

(54) SAFETY SWITCHED ON MACHINE POWER SUPPLY

(71) Applicant: ROCKWELL AUTOMATION TECHNOLOGIES, INC., Mayfield Heights, OH (US)

(72) Inventors: William H. Martin, Franklin, WI (US); Allison M. Keller, Seven Hills, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 464 days.

(21) Appl. No.: 18/466,331

(22) Filed: Sep. 13, 2023

(65) Prior Publication Data

US 2025/0085686 A1 Mar. 13, 2025

(51) Int. Cl.
*G05B 19/05* (2006.01)

(52) U.S. Cl.
CPC ......... *G05B 19/058* (2013.01); *G05B 19/054* (2013.01); *G05B 2219/14117* (2013.01)

(58) Field of Classification Search
None
See application file for complete search history.

(56) References Cited

U.S. PATENT DOCUMENTS

2018/0024605 A1* 1/2018 Haensgen ................ G05B 9/02 713/310
2018/0101156 A1* 4/2018 Kumar Kn ............... G05B 9/02
2018/0364670 A1* 12/2018 Dotson .................. H01H 19/64
2022/0247165 A1* 8/2022 Campbell ............ G05B 19/058
2023/0226692 A1* 7/2023 Hou ....................... B25J 9/1653 700/245

FOREIGN PATENT DOCUMENTS

CN 217739753 U * 11/2022

OTHER PUBLICATIONS

Electrical Engineering, "Housing a Power Supply", 2021, Stack Exchange, pp. 1-3 (hereinafter EESE) (Year: 2021).*
Coghlan, "NEC Class 2 circuits: power supply and circuit requirements", May 2023, Coghlan Contact, pp. 1-3 ( (Year: 2023).*

* cited by examiner

*Primary Examiner* — David Earl Ogg
(74) *Attorney, Agent, or Firm* — Quarles & Brady LLP

(57) ABSTRACT

A power supply for use in an industrial automation environment includes a housing, a safety input interface, a switched-mode power supply, safe-off circuitry, a first power output channel, a first protection circuit, a second power output channel, a second protection circuit, and a processor. The processor is configured to receive a safety input signal instructing the power supply to shut off power that is provided to industrial automation equipment via the first power output channel and further to cause the safe-off circuitry to shut off the power that is provided to the industrial automation equipment via the first power output channel.

20 Claims, 5 Drawing Sheets

SAFETY SWITCHED ON MACHINE POWER SUPPLY

BACKGROUND INFORMATION

Industrial automation environments, such as manufacturing plants with different robotic manufacturing cells, can include a variety of safety systems used to shut down equipment and protect individuals working in the industrial automation environment. These safety systems can involve significant efforts to turn off control voltages and allow individuals to safely enter various locations in the industrial automation environment. Additionally, the equipment within these safety systems often consumes a large amount of space and can be difficult to understand and manage. Systems, devices, and methods that can provide more effective and efficient safety functionality in industrial automation environments are generally desired.

BRIEF DESCRIPTION

One aspect of present disclosure is a power supply for use in an industrial automation environment. The power supply includes a housing; a safety input interface; a switched-mode power supply contained within the housing; safe-off circuitry contained within the housing and connected to the switched-mode power supply; a first power output channel that is connected to the switched-mode power supply for providing power to first industrial automation equipment; a first protection circuit that is connected to the first power output channel and configured to protect the first power output channel; a second power output channel that is connected to the switched-mode power supply for providing power to second industrial automation equipment; a second protection circuit that is connected to the second power output channel and configured to protect the second power output channel; and a processor configured to receive a safety input signal via the safety input interface instructing the power supply to shut off the power that is provided to the first industrial automation equipment via the first power output channel and cause the safe-off circuitry to shut off the power that is provided to the first industrial automation equipment via the first power output channel.

Another aspect of the present disclosure is a method for supplying power in an industrial automation environment. The method includes providing, via a first power output channel of a power supply device, power to first industrial automation equipment in the industrial automation environment, wherein the first power output channel is connected to a first protection circuit of the power supply device configured to prevent the power supply from delivering more than a first threshold amount of current to the first industrial automation equipment via the first power output channel; providing, via a second power output channel of the power supply device, power to second industrial automation equipment in the industrial automation environment, wherein the first power output channel is connected to a second protection circuit of the power supply device configured to prevent the power supply from delivering more than a second threshold amount of current to the second industrial automation equipment via the second power output channel; receiving, via a safety input interface of the power supply device, a safety input signal instructing the power supply device to shut off the power that is provided to the first industrial automation equipment; and causing the power supply device to shut off the power provided to the first industrial automation equipment via the first power output channel responsive to receiving the safety input signal via the safety input interface without causing the safe-off circuitry of the power supply device to shut off the power provided to the second industrial automation equipment via the second power output channel.

Yet another aspect of the present disclosure is another power supply for use in an industrial automation environment. The power supply includes a safety input interface; a switched-mode power supply; safe-off circuitry connected to the switched-mode power supply; a first power output channel that is connected to the switched-mode power supply for providing power to first industrial automation equipment; a first protection circuit that is connected to the first power output channel and configured to prevent the power supply from delivering more than a first threshold amount of current to the first industrial automation equipment via the first power output channel; a second power output channel that is connected to the switched-mode power supply for providing power to second industrial automation equipment; a second protection circuit that is connected to the second power output channel and configured to prevent the power supply from delivering more than a second threshold amount of current to the second industrial automation equipment via the second power output channel; and a processor configured to receive a safety input signal via the safety input interface instructing the power supply to shut off the power that is provided to the first industrial automation equipment and cause the safe-off circuitry to shut off the power that is provided to the first industrial automation equipment via the first power output channel.

DETAILED DESCRIPTION

The present disclosure provides various implementations of a power supply device and associated functionality that can be used to provide more effective and efficient safety functionality in industrial automation environments. In some existing industrial automation environments, such as existing automotive manufacturing plants, complex safety systems that include a vast collection of custom safety equipment are used to provide safety functionality. For example, existing automotive manufacturing plants can use small, custom-built electrical panels (e.g., 2 feet wide by 2 feet tall electrical panels) that include equipment such as power supplies, safety input/output (I/O) modules, safety relays, a safety programmable logic controller (PLC), circuit breakers, custom connectors (e.g., custom "T" connectors), extensive wiring, and other components to provide a 24V DC safety power signal (e.g., a bi-polar safety output signal) to equipment such as industrial robots, sensors, robotic actuators, and motors. These previous approaches often require significant design efforts and costs to build out the safety electrical panels and associated equipment. Moreover, if the safety electrical panels in these previous approaches need to be modified, significant efforts and costs are often required again to perform the modifications.

The power supply device described herein embeds multiple safety systems into a single power supply device. As such, the power supply device described herein can dramatically reduce the number of components needed to provide safety functionality for industrial automation equipment. The power supply device described can provide power to industrial automation equipment via separate, configurable output channels that can be used for either safety or standard power outputs. The power supply device described herein can provide a single safety turn-off for a control voltage supplied to a device within an industrial manufacturing cell, for example. By utilizing a single power supply for turning-off a control voltage, the overall number of safety system components required to provide safety functionality can be reduced, thereby eliminating the need for large custom-built panels to house safety system equipment. The power supply device described herein can receive safety commands from safety controllers and/or emergency stop devices and shut off power provided via different output channels accordingly.

Figure 1:
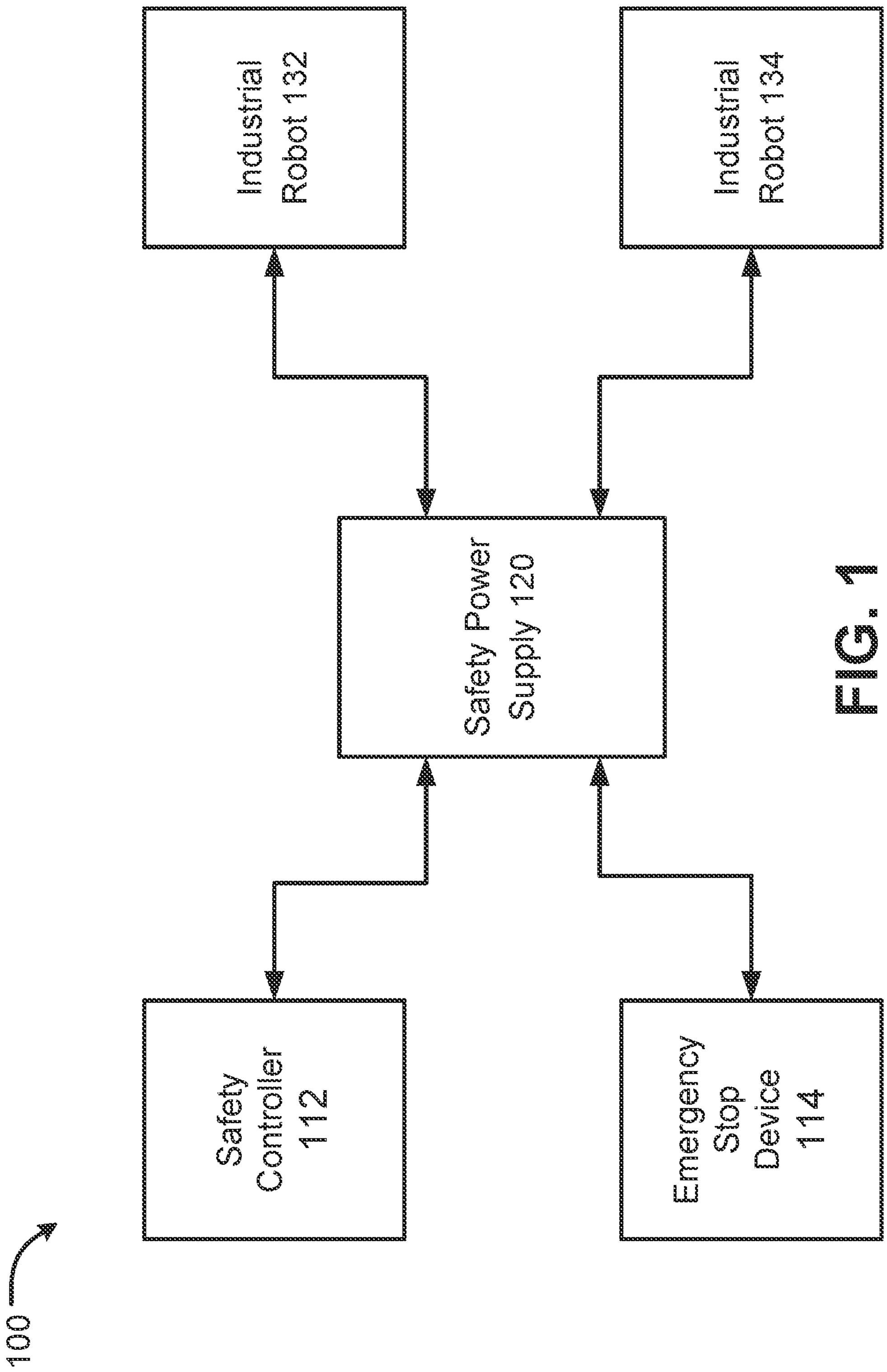
FIG. 1 is a block diagram showing an example system for providing safety functionality in an industrial automation environment, in accordance with some aspects of the disclosure.

Referring to FIG. 1, a block diagram illustrating an example system 100 for providing safety functionality in an industrial automation environment is shown, in accordance with some aspects of the disclosure. As shown in FIG. 1, the system 100 can include a safety controller 112, an emergency stop device 114, a safety power supply 120, an industrial robot 132, and an industrial robot 134. Generally, the system 100 can be used in a variety of different types of industrial automation environments, including different types of manufacturing facilities and assembly plants. The industrial automation environments can be in industries such as aerospace, automotive, cement, chemical processing, food and beverage, household and personal care, life sciences, marine operations, metals processing, mining operations, oil and gas, power generation, print and publishing, pulp and paper, semiconductors, warehouse and fulfillment, and wastewater treatment, among others.

The safety controller 112 can be any type of device used within the broader industrial automation environment to provide safety inputs to the safety power supply 120. For example, the safety controller 112 can be implemented using various types of safety programmable controllers used in the broader industrial automation environment. The safety controller 112 can also be implemented using various types of safety sensor devices, switches, relays, and other types of safety devices. Generally, the safety controller 112 can sense and/or receive indications of faults and other safety alerts that occur within the industrial automation environment. For example, the safety controller can detect and/or receive indications of short circuit events, overcurrent events, safety alarm events, extreme sensor readings, and the like. The safety controller 112 can be installed within an electrical panel in the industrial automation environment or can be provided outside of an electrical panel in the industrial automation environment.

The safety controller 112 can generally send commands (e.g., "safe off" commands) to the safety power supply 120 instructing the safety power supply 120 to shut off power provided to industrial automation equipment in the industrial automation environment. The safety controller 112 can send the commands to the safety power supply 120 using a variety of suitable protocols, such as using Open DeviceNet Vendors Association's (ODVA) Ethernet/IP protocol using Common Industrial Protocol (CIP) Safety communications, PI North America's Ethernet PROFINET protocol using PROFIsafe communications, serial communications, and/or other suitable communication networks and protocols. After the safety power supply 120 shuts off the power to the industrial automation equipment based on the command received from the safety controller 112, an individual such as a machine operator or a mechanic may safely work within the industrial automation environment to identify and fix the source of the fault.

The emergency stop device 114 can be any type of user input device installed in the industrial automation environment that can be used by personnel in the industrial automation environment to provide an emergency stop signal to the safety power supply 120. For example, the emergency stop device 114 can be a push button, a kill switch, etc. that can be activated by a machine operator to turn off the industrial robot 132 and/or the industrial robot 134. Upon activation, the emergency stop device 114 can send a safety command to the safety power supply 120 to turn off power to the industrial robot 132 and/or the industrial robot 134. Alternatively, the individual may place the emergency stop device 114 in a power on position, which causes the emergency stop device to send safety a command to the safety power supply 120 indicating that it is safe to resume providing power to the industrial robot 132 and/or the industrial robot 134. The emergency stop device 114 can be hard-wired to the safety power supply 120 to minimize the risk of communications failures between the emergency stop device 114. The emergency stop device 114 can communicate with the safety power supply 120 using a variety of suitable communications protocols, such as Ethernet/IP's CIP Safety, PROFINET's PROFIsafe, and/or other serial communications protocols.

The safety power supply 120 can be implemented in various ways, but generally the safety power supply 120 is a single power device that can be used to dramatically reduce the number of components and design complexity needed to provide safety power outputs in the industrial automation environment. Instead of providing a variety of interconnected components such as power supplies, safety I/O modules, safety relays, a safety PLC, circuit breakers, custom connectors, and the like within a custom-built electrical panel, the safety power supply 120 can perform a variety of safety functions electronically within a single device. The safety power supply 120, as noted, can receive safety commands from both the safety controller 112 and the emergency stop device 114, as well as other equipment that may be installed in the industrial automation environment. Moreover, the safety power supply can provide both safety power outputs and standard power outputs to industrial automation equipment via separate, configurable output channels, each with their own protection circuit, as detailed further below.

The industrial robot 132 can be implemented in various ways, but generally the industrial robot 132 receives power from the safety power supply 120 and is used within the industrial automation environment to perform one or more operations. For example, the industrial robot 132 can be used to install doors on vehicles, among other possible operations. The industrial robot 132 can be any suitable type of industrial robot, such as an articulated robot, a Selective Compliance Assembly Robot Arm (SCARA) robot, a Cartesian coordinate robot, a cylindrical coordinate robot, a delta robot, and other suitable types of robots. The industrial robot 132 can autonomously perform a variety of types of tasks, such as assembling, welding, material handling, inspecting, or collaborating with other industrial robots or other types of industrial automation equipment.

The industrial robot 134, like the industrial robot 132, can be implemented in various ways, but generally the industrial robot 134 receives power output from the safety power supply 120 and is used within the industrial automation environment to perform one or more operations. For example, the industrial robot 134 can be used to install bumpers on vehicles, among other possible operations. The industrial robot 134 can be implemented using any suitable type of industrial robot, such as an articulated robot, a SCARA robot, a Cartesian coordinate robot, a cylindrical coordinate robot, a delta robot, and other suitable types of robots. The industrial robot 134 can autonomously perform a variety of types of tasks, such as assembling, welding, material handling, inspecting, or collaborating with other industrial robots or other types of industrial automation equipment. In some implementations, the industrial robot 134 can collaborate with the industrial robot 132 to perform one or more operations in conjunction with the industrial robot 132.

It is important to note that the safety power supply 120 can be used with a variety of different types and configurations of industrial automation equipment and is not limited to applications where the safety power supply 120 provides power to one or more industrial robots. For example, equipment such as a three-phase motor, a fabrication machine (such as a drilling machine, milling machine, honing machine, etc.), a computer numerical control (CNC) machine, or similar pieces of equipment may be used in connection with the safety power supply 120. As such, the system 100 provides just one example implementation of a system in which the safety power supply can be used to provide more effective and efficient safety functionality in industrial automation environments.

Figure 2:
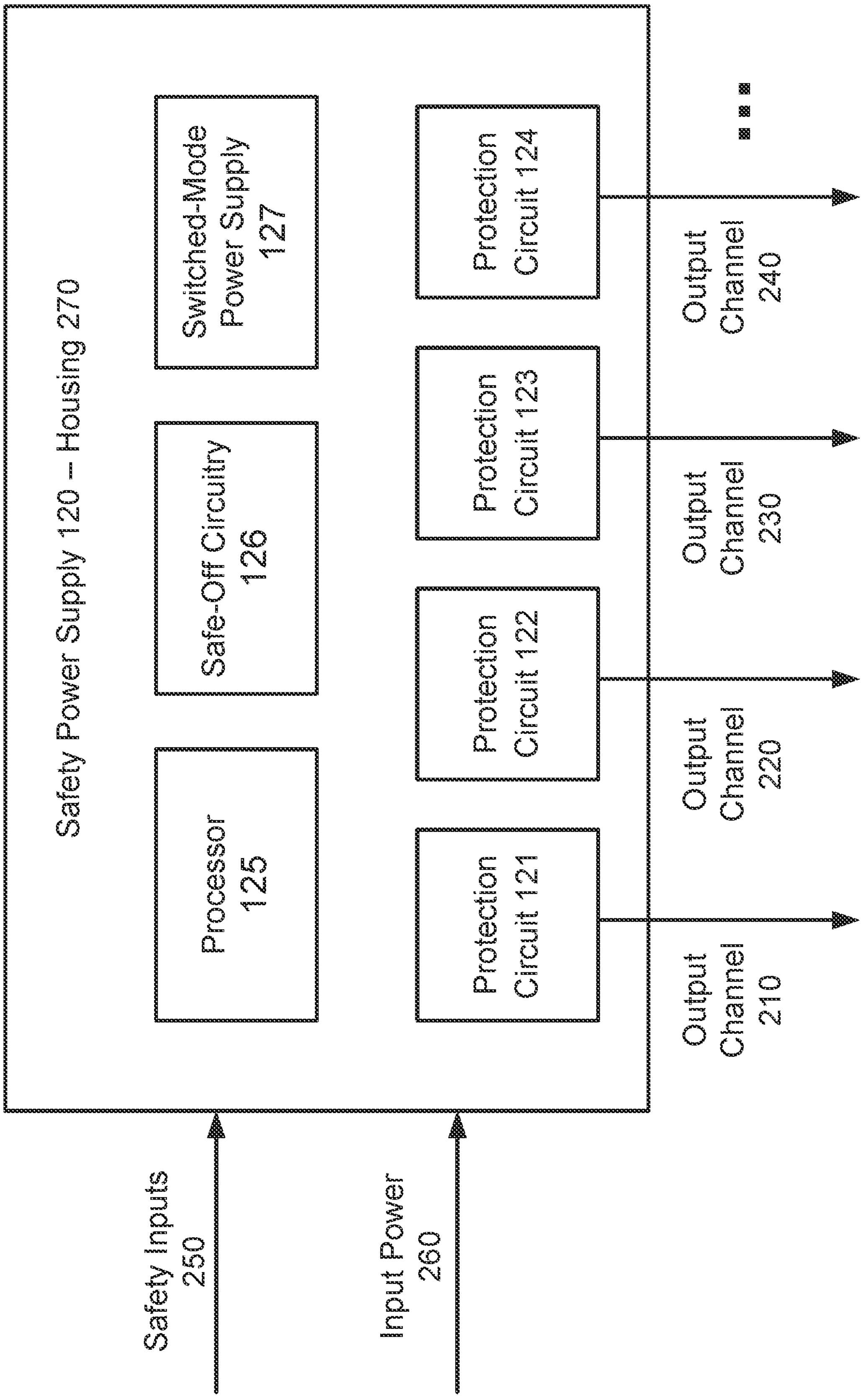
FIG. 2 is a block diagram showing example components of a power supply of the system of FIG. 1, in accordance with some aspects of the disclosure.

Referring to FIG. 2, a block diagram illustrating example components of the safety power supply 120 is shown, in accordance with some aspects of the disclosure. As shown in FIG. 2, the safety power supply 120 can include safety inputs 250, input power 260, a processor 125, safe-off circuitry 126, a switched-mode power supply 127, protection circuits 121, 122, 123, and 124, output channels 210, 220, 230, and 240, and a housing 270. The components of the safety power supply 120 as shown in FIG. 2 are provided as examples, and it is important to note that the safety power supply 120 can include more, fewer, and/or alternative components relative to what is shown in the example illustration of FIG. 2.

The safety inputs 250 can include any electrical signals that are received by the safety power supply 120 from other systems and devices in the industrial automation environment. For example, the safety power supply 120 can receive the safety inputs 250 from the safety controller 112 and/or the emergency stop device 114. The safety power supply 120 can receive the safety inputs 250 via a safety input interface of the safety power supply 120. The safety input interface of the safety power supply 120 can include any suitable communication ports, terminals, etc. for communicating with other systems and devices in the industrial automation environment, such as the safety controller 112 and/or the emergency stop device 114. For example, the safety input interface of the safety power supply 120 can include suitable ports for facilitating communication via Ethernet/IP's CIP Safety, PROFINET's PROFIsafe, and/or other serial communication protocols. The safety input interface of the safety power supply 120 can further include terminals for establishing a hard-wired connection between the safety power supply 120 and the emergency stop device 114. The safety inputs 250 can instruct the safety power supply 120 to shut off power to industrial automation equipment that receives power from the safety power supply 120.

The housing 270 can be implemented in a variety of ways, but generally provides an enclosure to protect and contain the internal components of the safety power supply 120. In some implementations, the housing 270 can provide shielding (e.g., electromagnetic shielding) to one or more internal components of the safety power supply 120. The housing 270 can include one or more openings to allow connections for the safety inputs 250, the input power 260, and/or the output power channels 210, 220, 230, and 240. These openings in the housing 270 can provide the ability to interface the safety power supply 120 with the safety controller 112, the emergency stop device 114, the industrial robot 132, and the industrial robot 134, for example. The housing 270 can be mounted inside of an electrical panel in the industrial automation environment. The housing 270 can also be mounted outside of any electrical panels and on a barrier that at least partially surrounds industrial automation equipment in the industrial automation environment. The barrier can be, for example, a metal caging that at least partially surrounds the industrial robot 132 and/or the industrial robot 134. This "on-machine" configuration for the safety power supply 120 can provide advantages in terms of configurability and accessibility.

The input power 260 can be any suitable source of power that is provided to the safety power supply 120. The input power 260 can be received from a variety of places in the industrial automation environment, such as from an electrical panel, from a power receptacle in the industrial automation environment, from other systems and/or devices in the industrial automation environment (e.g., the safety controller 112), and the like. The input power 260 can be used to operate the circuitry inside of the safety power supply 120, such as the processor 125, the safe-off circuitry 126, the switched-mode power supply 127, and the protection circuits 121, 122, 123, and 124. In some implementations, the input power 260 can also be provided at least partially by one or more batteries. The input power 260 can be any suitable type of power such as single-phase alternating current (AC) power, three-phase AC power, direct current (DC) power, and other suitable types of power.

The processor 125 can be implemented using any suitable hardware processor or combination of processors, including using one or more central processing units (CPUs) and/or other types of hardware processing circuitry. The processor 125 can further be implemented using any suitable number of processing cores, including single core processors, dual core processors, and other processor core configurations. The processor 125 can generally execute machine-readable instructions to perform various operations for the safety power supply 120, for example by executing machine-readable instructions stored in one or more non-transitory computer-readable storage media, such as in a memory of the safety power supply 120. The processor 125 can interact with the safety inputs 250 to perform one or more functions related to controlling the power supplied via the output channels 210, 220, 230, and 240. For example, the processor 125 can determine a command associated with a signal received from the safety input 250. This command may be associated with changing the power supplied via the output channels 210, 220, 230, and 240. The processor 125 can be in communication with the protection circuits 121, 122, 123, and 124 and the safe-off circuitry 126, and can cause the safe-off circuitry 126 to shut off and turn on power provided via the output channels 210, 220, 230, and 240.

The safe-off circuitry 126 can be implemented in various ways, but generally the safe-off circuitry 126 provides the power supply 120 with the ability to shut off power provided via any of the output channels 210, 220, 230, and 240. Notably, the safe-off circuitry 126 can be configured to shut off only certain output channels 210, 220, 230, and 240 without shutting off the other output channels 210, 220, 230, and 240. The safe-off circuitry can include any suitable type of electronic circuit components including various types of switches, transistors, resistors, capacitors, inductors, and other suitable electronic circuit components for implementing safe-off functionality within the safety power supply 120. The safe-off circuitry 126 can be connected electronically to the protection circuits 121, 122, 123, and 124 and/or the processor 125 to identify faults associated with individual output channels 210, 220, 230, and 240 and to shut off the appropriate individual output channels 210, 220, 230, and 240 accordingly. Generally, the safe-off circuitry 126 can provide a means for safely disconnecting the power being supplied to a industrial automation equipment by the safety power supply 120 via the output channels 210, 220, 230, and 240.

The switched-mode power supply 127 can be implemented in various ways, but generally the switched-mode power supply 127 can efficiently convert the input power 260 to output power provided to industrial automation equipment via the output channels 210, 220, 230, and 240. For example, the switched-mode power supply 127 can include a switching regulator that converts input AC power to DC power (e.g., 24 volts DC power). The switched-mode power supply 127 can also include any suitable additional components for converting the input power 260 to a form that is usable by industrial automation equipment in the industrial automation environment (e.g., the industrial robots 132 and 134). The switched-mode power supply 127 can be connected to the output channels 210, 220, 230, and 240, for example through the protection circuits 121, 122, 123, and 124.

The output channels 210, 220, 230, and 240 can be implemented in various ways, but generally the output channels 210, 220, 230, and 240 are separate, individually configurable power output channels that can be used to provide power to different industrial automation equipment. For example, the output channel 210 can be connected to the industrial robot 132 to provide power to the industrial robot 132 and the output channel 220 can be connected to the industrial robot 134 to provide power to the industrial robot 134. The output channels 210, 220, 230, and 240 can be implemented using various types of communications ports and/or terminals formed in the housing 270 to which various types of power cables and other wiring can be connected to transfer power between the safety power supply 120 and the associated industrial automation equipment. The output channels 210, 220, 230, and 240 can be used to provide power to various types of industrial automation equipment including industrial robots, motors, fabrication machines (e.g., drilling machines, milling machines, honing machines, etc.), computer numerical control (CNC) machines, and other types of industrial automation equipment.

The output channels 210, 220, 230, and 240 can provide the industrial automation equipment with the power generated by the switched-mode power supply 127. One or more of the output channels 210, 220, 230, and 240 can be provided as "standard" power channels that do not employ safety functionality (e.g., for powering various types of devices such as sensors that do not need to be shut down for safety concerns). Of course, one or more of the output channels 210, 220, 230, and 240 can also be provided as "safety" power channels that do employ safety functionality and can be shut off for safety concerns. One or more of the output channels 210, 220, 230, and 240 can further be used to provide power in accordance with National Electric Code (NEC) Class 2 standards, for example to provide power to smaller sensors and devices that consume less than 100 Watts of power.

The protection circuits 121, 122, 123, and 124 can be implemented in various ways, but generally the protection circuits 121, 122, 123, and 124 provide protection for the output channels 210, 220, 230, and 240, respectively. For example, the protection circuits 121, 122, 123, and 124 can each include one or more current sensors for sensing current delivered via the output channels 210, 220, 230, and 240, respectively. Since the output channels 210, 220, 230, and 240 are individually configurable, different current thresholds can be set within the safety power supply 120 (e.g., based on the safety inputs 250) for the different output channels 210, 220, 230, and 240 to prevent overcurrent conditions. Additionally, the protection circuits 121, 122, 123, and 124 can each include one or more voltage sensors for sensing different voltages associated with the output channels 210, 220, 230, and 240, and different voltage thresholds can be set within the safety power supply 120 (e.g., based on the safety inputs 250) for the different output channels 210, 220, 230, and 240 to prevent overvoltage conditions.

The protection circuits 121, 122, 123, and 124 generally provide a means for providing protection against faults that can occur within the safety power supply 120, or faults received from industrial automation equipment connected to the safety power supply 120 via the output channels 210, 220, 230, and 240. For example, the protection circuits 121, 122, 123, and 124 may prevent damage from occurring to the other components contained within the safety power supply 120 in the event of overcurrent, overvoltage, or other types of faults. The protection circuits 121, 122, 123, and 124 can include a variety of electrical circuit components, such as resistors, capacitors, switches, fuses, etc. The protection circuits 121, 122, 123, and 124 can be connected to the processor 125 and/or the safe-off circuitry 126 to provide indications of various types of faults.

It is important to note that, while the safety power supply is shown to include four output channels and four protection circuits in FIG. 2, the safety power supply 120 can include any suitable number of separate, individually configurable output channels and associated protections circuits. For example, the safety power supply 120 could include only one output channel, only two output channels, eight output channels, sixteen output channels, etc. Generally, the safety power supply 120 has a protection circuit for each output channel such that output power provided by the safety power supply 120 via any of the output channels can be protected from undesirable conditions such as overcurrent conditions and/or overvoltage conditions.

Figure 3:
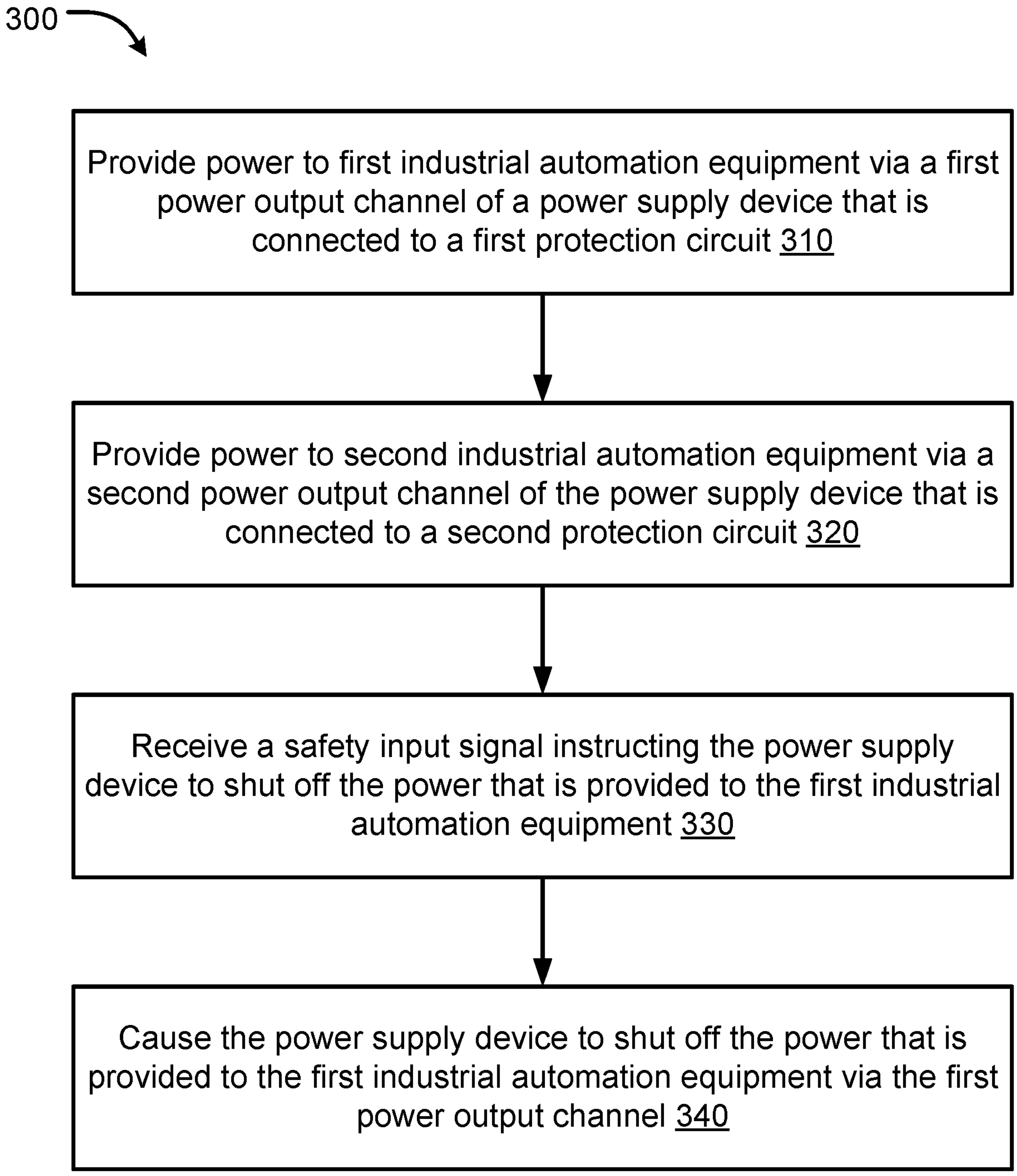
FIG. 3 is a flowchart showing an example process for providing safety functionality in an industrial automation environment using the power supply of FIG. 2, in accordance with some aspects of the disclosure.

Referring to FIG. 3, a flowchart illustrating an example process 300 for providing safety functionality in an industrial automation environment using the safety power supply 120 is shown, in accordance with some aspects of the disclosure. The process 300 can generally be used to efficiently provide safety functionality for industrial automation equipment using a single power supply device with separate, individually configurable and protected output channels. The process 300 can be used to process the safety inputs 250 received by the safety power supply 120 and perform shut off power provided via one or more of the output channels 210, 220, 230, and 240. As a result, the process 300 can be used to provide improved efficiency in terms of providing safety functionality for manufacturing operations in various industries such as aerospace, automotive, cement, chemical processing, food and beverage, household and personal care, life sciences, marine operations, metals processing, mining operations, oil and gas, power generation, print and publishing, pulp and paper, semiconductors, warehouse and fulfillment, and wastewater treatment, among others.

At 310, the process 300 can provide power to first industrial automation equipment via a first power output channel of a power supply device that is connected to a first protection circuit. For example, the safety power supply 120 can provide power to the industrial robot 132 via the output channel 210, where the output channel 210 is connected to the protection circuit 121. Notably, the output channel 210 is individually configurable, as detailed above. For example, the output channel 210 can be configured to provide various types of output power, such as various magnitudes of DC power, various types of AC power, etc. Moreover, the protection circuit 121 can be configured to protect the output channel 210 in accordance with various configurable parameters, such as various maximum and/or minimum current levels, voltage levels, and other configurable parameters.

At 320, the process 300 can provide power to second industrial automation equipment via a second power output channel of the power supply device that is connected to a second protection circuit. For example, the safety power supply 120 can provide power to the industrial robot 134 via the output channel 220, where the output channel 220 is connected to the protection circuit 122. Notably, like the output channel 210, the output channel 220 is individually configurable. The output channel 220 can be configured to provide various types of output power, such as various magnitudes of DC power, various types of AC power, etc. The protection circuit 122 can also be configured to protect the output channel 220 in accordance with various configurable parameters, such as various maximum and/or minimum current levels, voltage levels, and other configurable parameters.

At 330, the process 300 can receive a safety input signal instructing the power supply device to shut off the power that is provided to the first industrial automation equipment. For example, the processor 125 of the safety power supply 120 can receive the safety input signal from the safety controller 112 and/or the emergency stop device 114. The processor 125 can also receive the safety input signal from the protection circuit 121 and/or the protection circuit 122. For example, if a current sensor of the protection circuit 121 detects that too much current is being delivered to the first industrial automation equipment via the output channel 210 (e.g., the sensed current exceeds a threshold), then the protection circuit 121 can send a safety input signal to the processor 125. The safety input signal can also be initiated by a user via the emergency stop device 114. The user can be any of a variety of personnel associated with an industrial operation, such as various types of engineers, operators, mechanics, service providers, and other personnel. The safety power supply 120 can receive the safety input signal at 330 in a variety of suitable manners, for example using a variety of suitable communications protocols.

At 340, the process 300 can cause the power supply device to shut off the power that is provided to the first industrial automation equipment via the first power output channel. For example, the processor 125 can cause the safe-off circuitry 126 to shut off the power that is provided to the industrial robot 132 via the output channel 210 in response to receiving the safety input signal at 330. The processor 125 can identify a particular one or the output channels 210, 220 that needs to be shut off based on the safety input signal. For example, the processor 125 can use an identifier associated with the industrial robot 132 that is included in the safety input signal to determine that the power that is provided to the industrial robot 132 via the output channel 210 should be shut off. Notably, since the output channels 210, 220 are individually configurable, the safety power supply 120 can shut off the power that is provided to the industrial robot 132 via the output channel 210 without shutting off the power that is provided to the industrial robot 134 via the output channel 220.

Upon shutting off the power that is provided to the industrial robot 132 via the output channel 210, the industrial robot 132 may be powered off, thereby causing the industrial robot 132 to terminate all movements associated with a step in a manufacturing process. After powering off the industrial robot 132, personnel may be allowed to enter manufacturing cell environment containing the industrial robot 132 to adjust the industrial robot 132. By terminating the movement of the industrial robot 132, the safety power supply 120 can provide an environment that ensures personnel will not be injured when entering the environment. For example, a user may initiate a power-off command directed to the industrial robot 132 in order to adjust a component on the industrial robot 132. The functionality provided by the process 300 can provide significant improvement in terms of efficiently turning off the control voltage provided to the industrial robot 132, thereby facilitating a safe environment for the user to adjust the industrial robot 132.

It should be noted that while the steps of the process 300 are shown in a particular order in FIG. 3, the process 300 may not include all steps shown, may include additional steps, or may include the steps in a different order. For example, a safety-off command may not be initiated by a user. Instead, a safety-off command may be the result of a fault detected by the safety controller 112. In such a case, the steps 320, 330, and 340 remain. However, following step 340, a user may need to enter a cell environment in order to make repairs on the industrial equipment with caused the fault in the safety controller 112.

Figure 4:
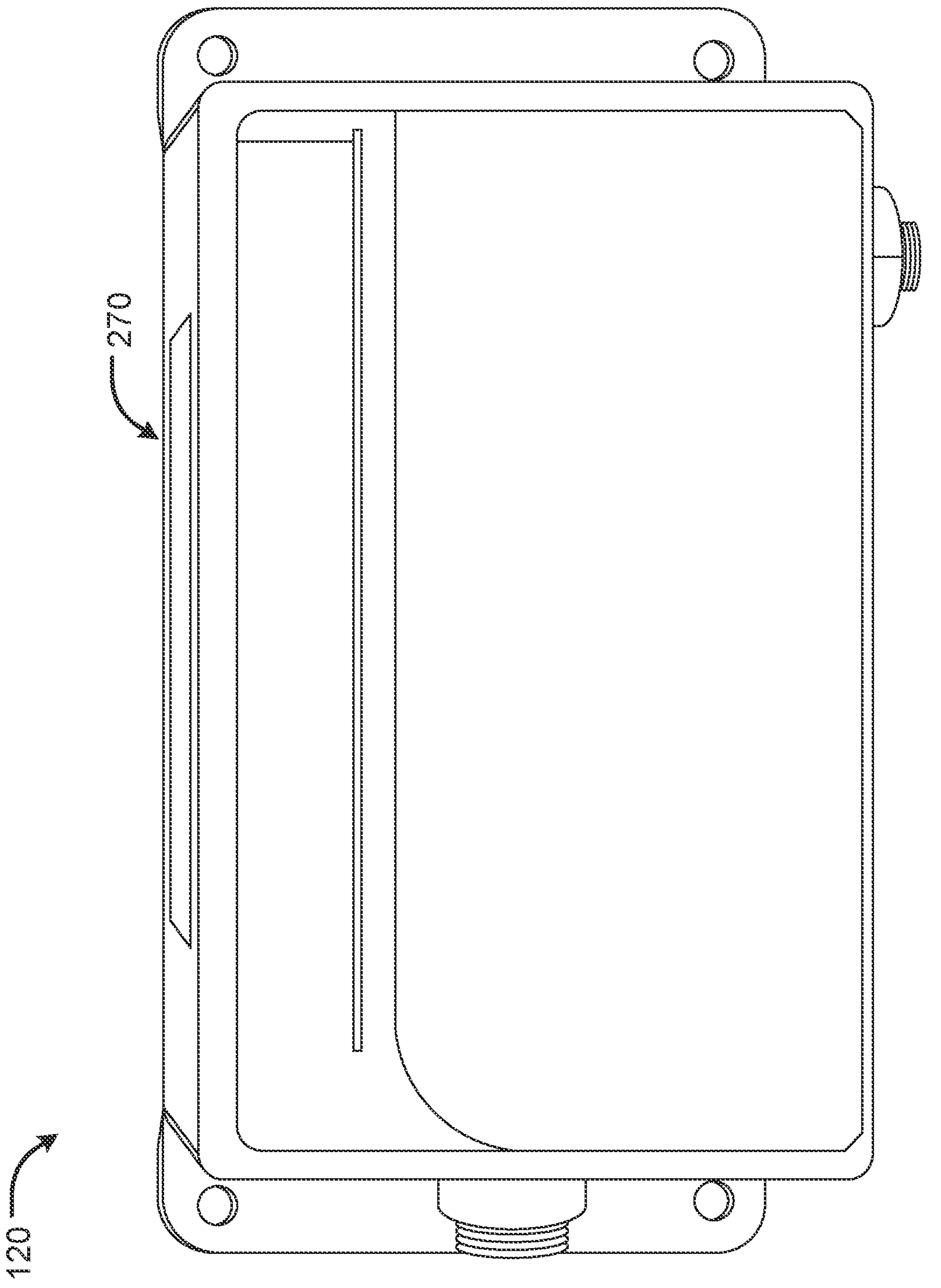
FIG. 4 is a perspective illustration showing an example implementation of the power supply of FIG. 2 and associated housing, in accordance with some aspects of the disclosure.

Referring to FIG. 4, a perspective illustration showing an example implementation of the safety power supply 120 and the housing 270 is shown, in accordance with some aspects of the disclosure. This implementation of the safety power supply 120 and the housing 270 provides a single, compact device that integrates a variety of components that may otherwise be separately provided. For example, the safety power supply 120 and the housing 270 as shown can be used to replace a custom-built electrical panel that includes equipment such as power supplies, I/O modules, relays, PLCs, circuit breakers, custom connectors, and extensive wiring. The housing 270 can be mounted inside of an electrical panel or can be mounted on a barrier that at least partially surrounds industrial automation equipment, among other possible options for installing the safety power supply 120 within an industrial automation environment.

Figure 5:
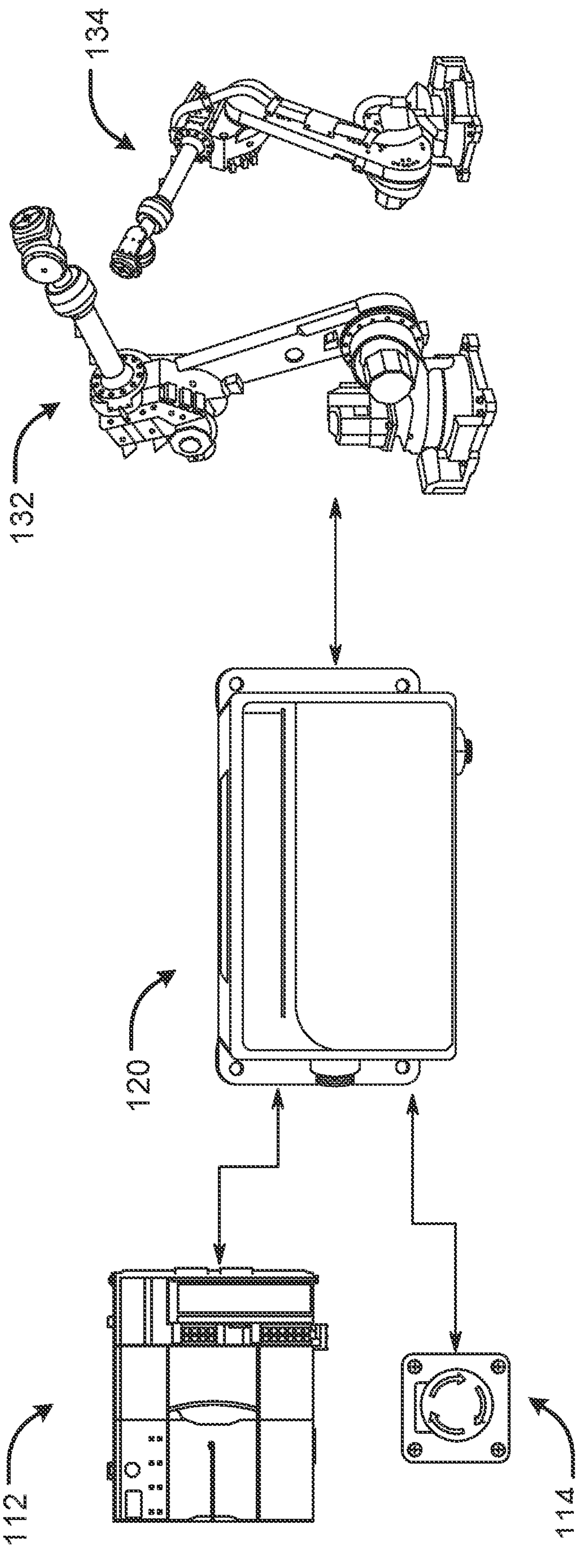
FIG. 5 is a perspective illustration showing an example implementation of the system of FIG. 1 and associated components, in accordance with some aspects of the disclosure.

Referring to FIG. 5, a perspective illustration showing an example implementation of the system 100 is shown, in accordance with some aspects of the disclosure. In the implementation of the system 100 shown in FIG. 5, the safety controller 112 is provided as a GuardLogix controller as produced by Rockwell Automation, Inc. Also, in the implementation of the system 100 shown in FIG. 5, the emergency stop device 114 is provided as a push button. Finally, in the implementation of the system 100 shown in FIG. 5, the industrial robot 132 and the industrial robot 134 are provided as robotic arms. The example implementation of the system 100 shown in FIG. 5 can be used in an automotive manufacturing plant, for example.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A power supply for use in an industrial automation environment, comprising:

a housing;

a safety input interface;

a switched-mode power supply contained within the housing;

safe-off circuitry contained within the housing and connected to the switched-mode power supply;

a first power output channel that is connected to the switched-mode power supply and is for providing power to first industrial automation equipment;

a first protection circuit that is connected to the first power output channel and configured to protect the first power output channel;

a second power output channel that is connected to the switched-mode power supply and is for providing power to second industrial automation equipment, wherein the switched-mode power supply is configured to simultaneously supply regulated output power to the first power output channel and the second power output channel;

a second protection circuit that is connected to the second power output channel and configured to protect the second power output channel; and a processor configured to:

receive a safety input signal via the safety input interface, the safety input signal instructing the power supply to shut off the power that is provided to the first industrial automation equipment via the first power output channel; and responsive to receipt of the safety input signal, cause the safe-off circuitry to shut off the power that is provided to the first industrial automation equipment via the first power output channel without causing the safe-off circuitry to shut off the power that is provided to the second industrial automation equipment via the second power output channel.

2. The power supply of claim 1, wherein the processor is configured to receive the safety input signal from a safety controller in the industrial automation environment that is separate from the power supply.

3. The power supply of claim 1, wherein the processor is configured to receive the safety input signal from an emergency stop device in the industrial automation environment that is separate from the power supply.

4. The power supply of claim 3, wherein the emergency stop device is hard-wired to the power supply.

5. The power supply of claim 1, wherein:

the first protection circuit is configured to prevent the power supply from delivering more than a first threshold amount of current via the first power output channel; and the second protection circuit is configured to prevent the power supply from delivering more than a second threshold amount of current via the second power output channel.

6. The power supply of claim 1, wherein the first power output channel provides the power to the first industrial automation equipment in the industrial automation environment in accordance with National Electric Code (NEC) Class 2 standards.

7. The power supply of claim 1, wherein:

the first industrial automation equipment comprises a first industrial robot; and the second industrial automation equipment comprises a second industrial robot.

8. The power supply of claim 1, wherein the housing of the power supply is mounted outside of an electrical panel and on a barrier that at least partially surrounds at least one of the first industrial automation equipment or the second industrial automation equipment.

9. The power supply of claim 1, wherein the housing of the power supply is mounted inside of an electrical panel in the industrial automation environment.

10. The power supply of claim 1, wherein:

the first power output channel is configured as a safety power channel that is subject to the safety input signal; and the second power output channel is configured as a standard power channel that is not subject to the safety input signal.

11. The power supply of claim 1, comprising:

a third power output channel that is connected to the switched-mode power supply for providing power to third industrial automation equipment; and a third protection circuit that is connected to the third power output channel and configured to protect the third power output channel.

12. The power supply of claim 1, wherein at least one of the first protection circuit or the second protection circuit comprises a current sensor.

13. A method for supplying power in an industrial automation environment, the method comprising:

providing, via a first power output channel of a power supply device that receives regulated output power from a switched-mode power supply of the power supply device, power to first industrial automation equipment in the industrial automation environment, wherein the first power output channel is connected to a first protection circuit of the power supply device configured to prevent the power supply from delivering more than a first threshold amount of current to the first industrial automation equipment via the first power output channel;

providing, via a second power output channel of the power supply device that receives regulated output power from the switched-mode power supply of the power supply device simultaneously with the first power output channel, power to second industrial automation equipment in the industrial automation environment, wherein the second power output channel is connected to a second protection circuit of the power supply device configured to prevent the power supply from delivering more than a second threshold amount of current to the second industrial automation equipment via the second power output channel;

receiving, via a safety input interface of the power supply device, a safety input signal instructing the power supply device to shut off the power that is provided to the first industrial automation equipment; and causing the power supply device to shut off the power provided to the first industrial automation equipment via the first power output channel responsive to receiving the safety input signal via the safety input interface without causing the safe-off circuitry of the power supply device to shut off the power provided to the second industrial automation equipment via the second power output channel.

14. The method of claim 13, wherein receiving the safety input signal via the safety input interface of the power supply device comprises receiving the safety input signal from a safety controller in the industrial automation environment that is separate from the power supply device.

15. The method of claim 13, wherein receiving the safety input signal via the safety input interface of the power supply device comprises receiving the safety input signal from an emergency stop device in the industrial automation environment that is separate from the power supply device.

16. A power supply for use in an industrial automation environment, comprising:

a safety input interface;

a switched-mode power supply;

safe-off circuitry connected to the switched-mode power supply;

a first power output channel that is connected to the switched-mode power supply and is for providing power to first industrial automation equipment;

a first protection circuit that is connected to the first power output channel and configured to prevent the power supply from delivering more than a first threshold amount of current to the first industrial automation equipment via the first power output channel;

a second power output channel that is connected to the switched-mode power supply and is for providing power to second industrial automation equipment, wherein the switched-mode power supply is configured to simultaneously supply regulated output power to the first power output channel and the second power output channel;

a second protection circuit that is connected to the second power output channel and configured to prevent the power supply from delivering more than a second threshold amount of current to the second industrial automation equipment via the second power output channel; and a processor configured to:

receive a safety input signal via the safety input interface, the safety input signal instructing the power supply to shut off the power that is provided to the first industrial automation equipment; and responsive to receipt of the safety input signal, cause the safe-off circuitry to shut off the power that is provided to the first industrial automation equipment via the first power output channel without causing the safe-off circuitry to shut off the power that is provided to the second industrial automation equipment via the second power output channel.

17. The power supply of claim 16, wherein the processor is configured to receive the safety input signal from a safety controller in the industrial automation environment that is separate from the power supply.

18. The power supply of claim 16, wherein the processor is configured to receive the safety input signal from an emergency stop device in the industrial automation environment that is separate from the power supply and hard-wired to the power supply.

19. The power supply of claim 16, wherein a housing of the power supply is mounted outside of an electrical panel and on a barrier that at least partially surrounds at least one of the first industrial automation equipment or the second industrial automation equipment.

20. The power supply of claim 1, wherein the switched-mode power supply comprises a switching regulator configured to convert alternating current (AC) power to direct current (DC) power.

* * * * *